No. 719,727. PATENTED FEB. 3, 1903.
A. E. BLOCK.
COFFEE POT.
APPLICATION FILED OCT. 15, 1902.

NO MODEL.

Witnesses
Inventor
Alexander E. Block.
by Higdon & Longan attys.

UNITED STATES PATENT OFFICE.

ALEXANDER E. BLOCK, OF ST. LOUIS, MISSOURI.

COFFEE-POT.

SPECIFICATION forming part of Letters Patent No. 719,727, dated February 3, 1903.

Application filed October 15, 1902. Serial No. 127,438. (No model.)

*To all whom it may concern:*

Be it known that I, ALEXANDER E. BLOCK, of the city of St. Louis, State of Missouri, have invented certain new and useful Improvements in Coffee-Pots, of which the following is a full, clear, and exact description, reference being had to the accompanying drawings, forming a part hereof.

My invention relates to improvements in coffee-pots, and has for its object to provide means whereby in that class of coffee-pots in which the coffee is made by the drip process the straining-surface may be adjusted at the will of the operator in order that the same strength of coffee may be produced in a large coffee-pot regardless of the quantity of coffee desired to be made.

My invention consists in the peculiar construction and arrangement of parts hereinafter described and claimed and will more fully be understood by reference to the accompanying drawings, forming part of this specification, in which—

Figure 1:
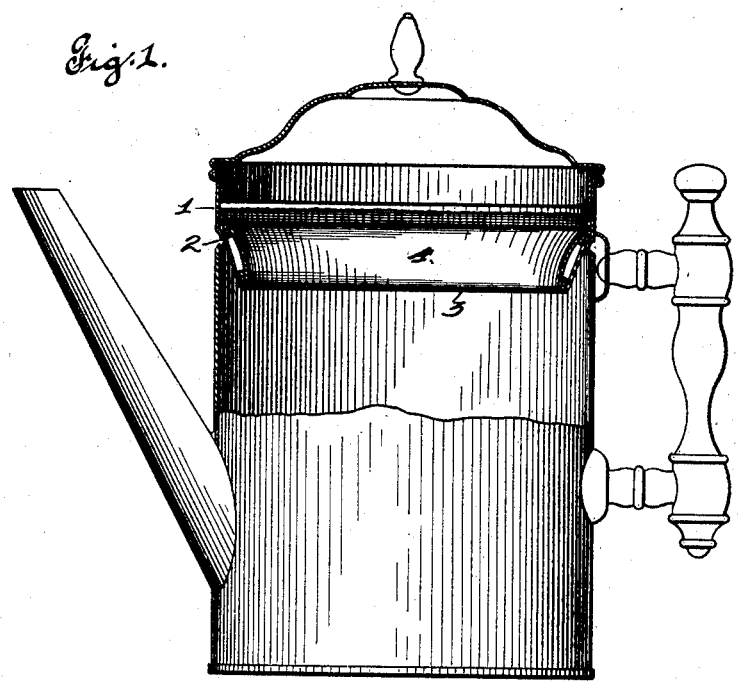
Figure 2:
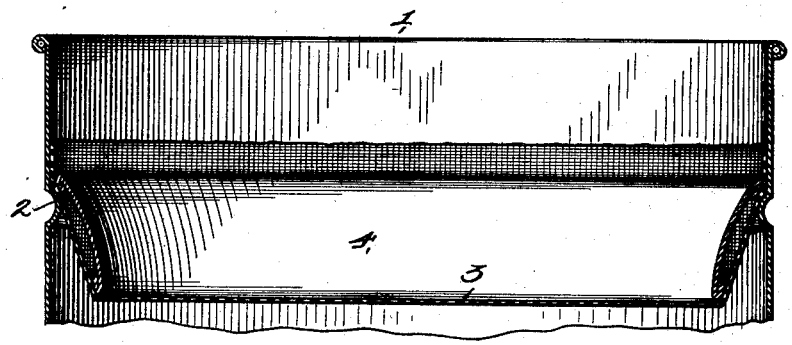
Figure 3:
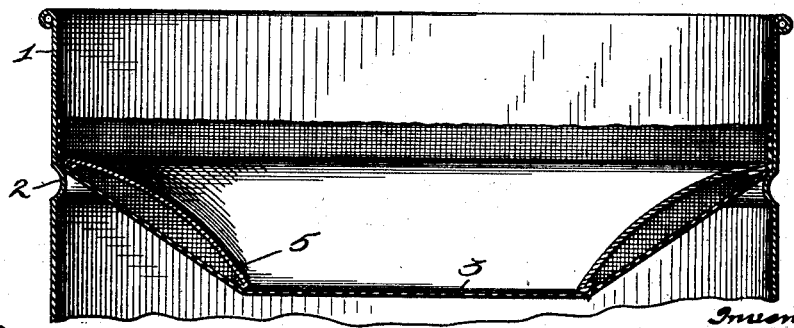

Figure 1 is an elevation showing the strainer, its attachment, and the mode of suspension in section. Fig. 2 is a section of my coffee-pot, showing a large straining-surface exposed. Fig. 3 is a section of my coffee-pot, showing a small straining-section exposed.

I employ a coffee-pot 1, which is of ordinary construction and is provided with the inwardly-projecting bead 2. The straining material 3 is stretched and held in suspension by means of the collar 4, about which it is drawn before the collar is thrust into the coffee-pot. The collar 4 is thrust downward until its upper edges come in sufficient close contact with the bead 2 to hold the straining material 3 tightly stretched and in place.

By means of a collar of the relative form and size shown in Figs. 1 and 2 the coffee-pot is adapted to be used for the production of its full capacity. When, however, it is desired to use a large coffee-pot for the production of two or more cups of coffee or any quantity materially less than the capacity of the coffee-pot, the quantity of ground or pulverized coffee is proportionately less and in many cases will not be sufficient to cover the straining-surface in a large coffee-pot. The result of such a condition is that water used in producing the coffee is to be poured over the straining-surface repeatedly, and it is difficult, if not impossible, to produce a small quantity of coffee of the same strength as would be produced if the ground or pulverized coffee completely covered the straining-surface. In addition to this the length of time required to draw off the hot water into another vessel and pour it over the straining-surface in repeated operation is considerable.

The principal object to be attained, therefore, is to adapt the coffee-pot to act as a true drip-coffee pot, in which instance by providing it with means whereby the exposed straining-surface shall be completely covered with ground or pulverized coffee regardless of the amount of liquid coffee desired to be produced. This result I attain by means of a series of funnel-shaped rings of the general form indicated by the ring 5 in Fig. 3. By means of adjusting the size and number of these rings in proportion to the size of the coffee-pot in which they are to be used there will be at all times the same thickness of ground or pulverized coffee upon the straining-surface 3 regardless of the amount of liquid coffee to be produced.

In practice I have found it advisable to turn the upper and lower edges of the rings 4 and 5 over upon themselves in order to present a smooth rounded bearing-surface to the straining-cloth 3.

It will be understood that the straining-cloth 3 may be made indifferently of material or cloth or any other fibrous material and that in use it should extend above the upper edges of the rings 4 and 5 in order that it may be held firmly stretched about the lower edges of said rings and may form a practically water-tight joint between the rings and the bead 2 when in use.

Having thus described my invention, what I claim as new, and desire to have secured to me by the grant of Letters Patent, is—

In a coffee-pot, the combination of the body portion provided with an inwardly-projecting circular bead, a straining-cloth and a removable funnel-shaped ring adapted to hold said straining-cloth against said bead and to reduce the surface thereof exposed to the coffee, whereby rings with openings of different diameters may be employed, substantially as specified.

In testimony whereof I affix my signature in presence of two witnesses.

ALEXANDER E. BLOCK.

Witnesses:
ALFRED A. EICKS,
M. G. IRION.